March 24, 1942. H. L. ALEXANDER ET AL 2,277,053
APPARATUS FOR RECOVERY OF LIQUIDS FROM SOLIDS
Original Filed Aug. 31, 1936
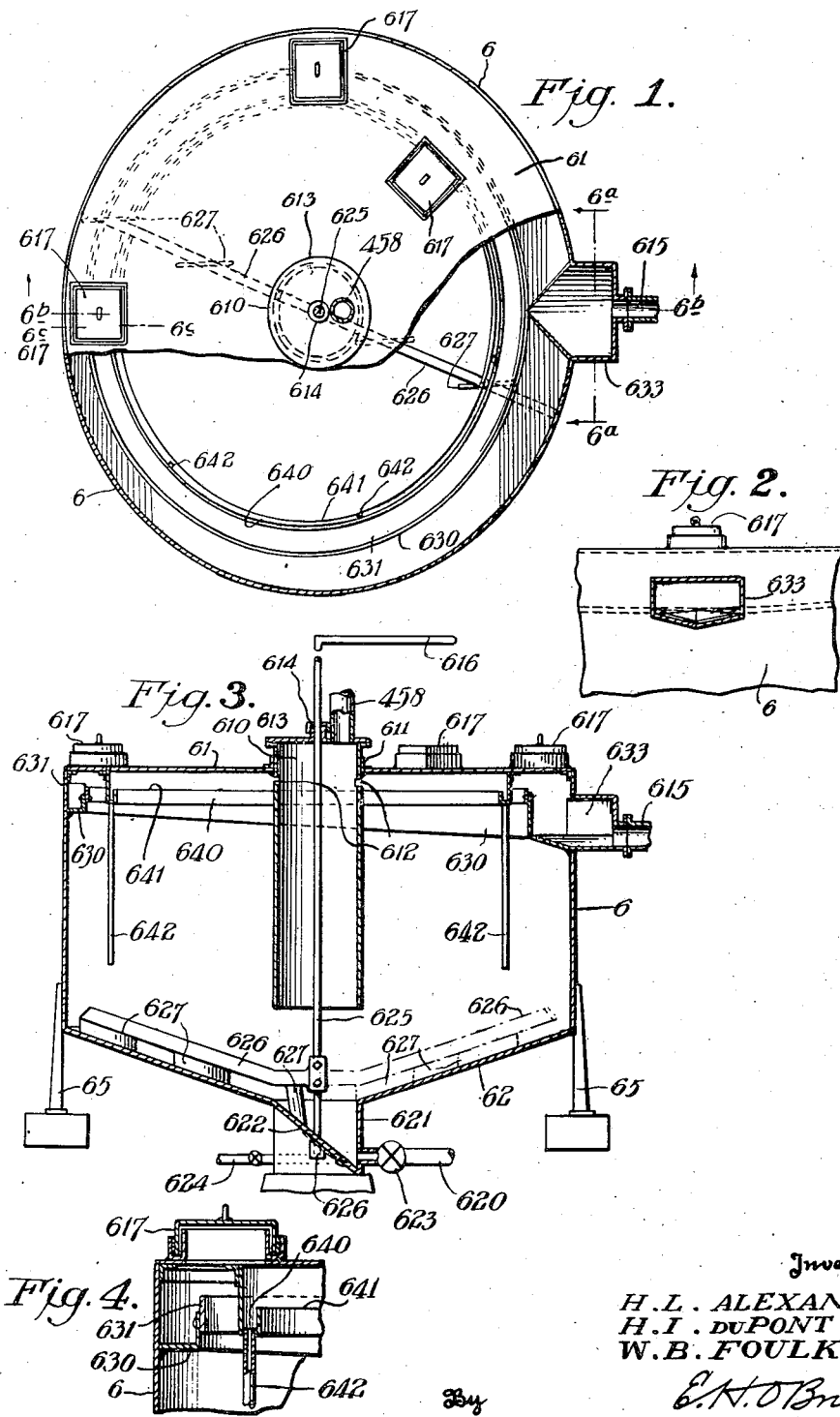
Inventors
H. L. ALEXANDER
H. I. DuPONT AND
W. B. FOULKE
By E. H. O'Brien
Attorney Patented Mar. 24, 1942

2,277,053

UNITED STATES PATENT OFFICE 2,277,053

APPARATUS FOR RECOVERY OF LIQUIDS FROM SOLIDS

Henry L. Alexander, Wilmington, and Hubert I. Du Pont, Rockland, Del., and Willing B. Foulke, Media, Pa., assignors to Delaware Chemical Engineering and Development Company, Wilmington, Del., a corporation of Delaware Original application August 31, 1936, Serial No. 98,819, now Patent No. 2,150,899, dated March 21, 1939. Divided and this application March 20, 1939, Serial No. 263,083

3 Claims. (Cl. 210—55)

This invention relates to an improved settling tank and to the process of recovering liquids carried out in conjunction therewith. More specifically, it relates to a settling tank or separator of novel and improved construction which is especially adapted for recovering "heavy" or "parting" liquid from liquid mixtures and suspensions in which the parting liquid is present. While not restricted to use only in conjunction with mineral separation systems employing flotation principles, such as that disclosed in our copending patent application Ser. No. 98,819, filed August 31, 1936 now Patent No. 2,150,899, of which this is a division, it is especially useful in conjunction with such apparatus.

An object of this invention, accordingly, is the development of an improved settling tank construction which is especially valuable for utilization in a liquid recovery system for the recovery of heavy or parting liquid when employed in conjunction with mineral separation apparatus and methods employing flotation principles. Other objects of this invention will be apparent from the resulting disclosure of our preferred embodiment thereof.

Referring now to the drawings, Fig. 1 represents a plan view, partly cut away and in section, of our improved settling tank or separator. Fig. 2 is a section taken on the line 6a—6a of Fig. 1 and looking in the direction of the arrows. Fig. 3 is a vertical section taken on the line 6b—6b of Fig. 1 and looking in the direction of the arrows. Fig. 4 is an enlarged section taken on the line 6c—6c of Fig. 1, also looking in the direction of the arrows.

Referring specifically to the construction illustrated in the drawing, the separating apparatus as a whole is designated by the numeral 6. Liquid containing light suspensoidal matter is carried from a primary settling tank (not shown) to the settling tank or separator herein disclosed through a pipe whose discharge end is designated by the numeral 458. The top of the settling tank is represented by the numeral 61, while 610 represents a tubular member which extends through and fits into an opening in the top 61. This tubular member 610 is secured to the top 61 with a hermetical joint by means of angle irons 611. The joining of the two members may be accomplished by welding or any other suitable means of hermetical sealing.

Tubular member 610 extends to the bottom of the tank, this bottom being represented generally by the numeral 62. There are provided openings 612 in the side of the tubular member above the water or liquid line when the device is in operation. A cover for the tubular member, 613, is provided, through which discharge pipe 458 leads into the tubular member. The bottom of the tank 62, is in the form of a truncated cone, of which 621 is a sump connected to the truncation of the cone. This sump may be formed by passing a plane diagonally through a cylinder. Numeral 622 represents a diagonal plane dividing the "cylinder" 621 and forming a diagonal bottom on the sump which directs the solids which collect therein toward discharge pipe 620, which is provided with valve 623. A pipe conveying water under pressure, 624, is provided so that the water may be used for dislodging sludge from the bottom of the sump 621 if and when said sludge becomes too solid to be moved by pumps.

A rod 625 journalled in bearing 626 in plate 622 extends upwardly through the tank in a vertical position and passes out through stuffing box 614 in cover 613. Handle 616 is attached to the upper end of the rod 625. At the lower portion of the rod there are arms 626 attached thereto in such a manner as to be rotatable by and with the handle 616 and the rod 625. Diagonal scrapers 627 are placed on arm 626 so that their movement will dislodge collected sludge from the conical bottom 622 and push it toward the sump 621.

Water seal covers 617 are provided for affording access to the interior of the apparatus. These covers are provided with extending legs or flanges which are immersed in a channel filled with water so as to form an effective seal to prevent the escape of vapors from within the settling tank to the outer atmosphere. Angle member 630, of a depth which increases from one side of the tank to the other, is welded or otherwise connected to the inside of the tank 6 toward the top thereof. There is provided a wooden weir strip 631 of circular form attached to angle member 630. A discharge box 633 is located at the lowest point of the channel formed by tank 6 and angle member 630. Pipe 615 is connected to the box 633. A circular channel 640 is suspended from the top 61 of the tank 6 within the weir and is provided with a lip 641 which is slightly lower than the top of the weir 631. Pipes 642 project inwardly from channel 640 toward the bottom of the tank. The tank 6 is supported by metal legs 65 attached to the tank and supported from any desired supporting structure or apparatus.

In operation our improved settling tank or separator functions as follows. The liquid containing light suspensoidal matter in larger or smaller amounts enters the tank through pipe 458 and tube 610. It passes outwardly beneath tube 610, tending to throw toward the bottom the heavier suspensoidal matter and to rise toward the surface, whose level is established by weir 631. The vibrations caused by the plunge of the liquid or water from the pipe 458 into the body of liquid within the tank are largely spent within the tube, so that the liquid within the remainder of the tank is comparatively quiet. The channel which is formed between the weir and the shell of the tank is sloped and increased in size towards its outlet. The liquid which flows over the weir follows the slope downwardly to the box 633 and is carried by the pipe 615 out of the apparatus and to any suitable place. This may be the headers 442 (not shown) which are described in our copending application previously referred to. Light scum tends to float on the surface of the liquid within the tank, and the direction of the liquid currents would in the normal course wash this scum over the weir 631. Openings 612 are operated as vents to relieve interior pressure. Interposed between the weir and the pipe 458 is scum gutter 640. As the scum, floating on the surface of the weir and being drawn by the current toward the weir, floats over the edge 641 of the scum gutter, which is slightly lower than the weir and contacts the side of the scum gutter, the scum tends to precipitate therein. As it is precipitated its apparent specific gravity increases to the point where it will follow the tube 642 downwardly into the lower section of the tank, where it will settle on the bottom and be drawn off with the sludge. The sludge which concentrates in the bottom is from time to time scraped toward the sump and pumped through valves 623 and pipes 620 to the sludge trap and still (not shown, but described and claimed in our copending application Ser. No. 98,819, filed August 31, 1936, now Patent No. 2,150,899). If the pipe becomes blocked, it may be cleared by an injection of water through pipe 624.

Although our improved apparatus and process have been described in conjunction with the mineral separation equipment disclosed in our copending application Ser. No. 98,819, and in connection with the sludge trap and steam still shown in our copending application Ser. No. 98,819, now Patent No. 2,150,899, neither the apparatus nor the process is limited to use in connection with that apparatus, but is of broad general utility wherever separation of liquids and settling of solids therein is to be carried out. Thus, the provision of a separator or settling tank with a scum trap for the purpose of coagulating and returning scum or liquid fractions which tend to precipitate therein to a lower portion of the apparatus where the sludge settles by gravity is of general utility, and is not necessarily restricted to use in conjunction with the separation of minerals by flotation methods. Although the preceding description of a preferred embodiment of our invention has referred to water and to heavy or parting liquid, both our apparatus and method are obviously useful in securing the precipitation of suspended solids from any liquid or any mixture of liquids, whether one of these liquids be an aqueous liquid or not.

As numerous modifications and changes may be made in our construction and process as described, which changes and modifications would still come within the purview of our invention, its scope is not to be restricted to details characteristic of our preferred embodiment, given merely as illustrative, except as necessitated by the appended claims and by the prior art. In the claims the word "liquid" or "liquids" means the liquid or mixture of liquids in which the solid matter is suspended.

We claim:

1. A settling tank for separating solid matter suspended in a liquid from said liquid which comprises; a tank of generally circular cross-section provided with a generally conical bottom; an inlet pipe centrally disposed within said settling tank and having its outlet end positioned below the normal level of liquid in said settling tank whereby a suspension of solids in liquid may be introduced through said inlet pipe into said settling tank adjacent the bottom of said tank and in such manner that the settling of solids previously introduced into said tank is not appreciably disturbed by the introduction of further amounts of said suspension, said centrally disposed inlet pipe being in communication with a conduit for supplying a suspension of solids in liquids from an outside source to said settling tank; a circumferentially extending channel positioned within said settling tank and at the upper portion thereof, said channel paralleling the circumferential external wall of said settling tank and being provided with a weir portion over which supernatant liquid may flow from said settling tank into said circumferentially extending channel; a scum gutter positioned closely adjacent said channel and closely paralleling said channel, said scum gutter being formed with an edge portion positioned at a slightly lower level than the level of said weir, whereby floating scum may be withdrawn from said supernatant liquid into said scum gutter before said supernatant liquid can overflow said weir into said circumferentially extending channel; means for returning said removed scum to the lower portion of said settling tank; a conduit for transporting said supernatant liquid from said circumferentially extending channel outside of said settling tank; and means for removing precipitated solids from the bottom of said settling tank.

2. A settling tank for separating solid matter suspended in a liquid from said liquid which comprises; a tank of generally circular cross-section provided with a generally conical bottom; an inlet pipe centrally disposed within said settling tank and having its outlet end positioned below the normal level of liquid in said settling tank whereby a suspension of solids in liquid may be introduced through said inlet pipe into said settling tank adjacent the bottom of said tank and in such manner that the settling of solids previously introduced into said tank is not appreciably disturbed by the introduction of further amounts of said suspension, said centrally disposed inlet pipe being in communication with a conduit for supplying a suspension of solids in liquids from an outside source to said settling tank; a circumferentially extending channel positioned within said settling tank and at the upper portion thereof, said channel paralleling the circumferential external wall of said settling tank and being provided with a weir portion over which supernatant liquid may flow from said settling tank into said circumferentially extending channel; a scum gutter positioned closely adjacent said channel and closely paralleling said channel, said scum gutter being formed with an edge portion positioned at a slightly lower level than the level of said weir, whereby floating scum may be withdrawn from said supernatant liquid into said scum gutter before said supernatant liquid can overflow said weir into said circumferentially extending channel; means for returning said removed scum to the lower portion of said settling tank; a conduit for transporting said supernatant liquid from said circumferentially extending channel outside of said settling tank; a discharge outlet positioned in the bottom of said tank for removing precipitated solids from the bottom of said settling tank; and a water jet positioned in said outlet and assisting in the removal of said precipitated solid matter from said settling tank.

3. A settling tank for separating solid matter suspended in liquid from said liquid which comprises; a tank of generally circular cross-section provided with a generally conical bottom; an inlet pipe centrally disposed within said settling tank and having its outlet end positioned below the normal level of liquid in said settling tank whereby a suspension of solids in liquids may be introduced through said inlet pipe into said tank and in such manner that the settling of solids previously introduced into said tank is not appreciably disturbed by the introduction of further amounts of said suspension, said centrally disposed inlet pipe being in communication with a conduit for supplying a suspension of solids in liquids from an outside source to said settling tank; an angle member with an upstanding leg positioned within said settling tank adjacent the upper portion thereof, said upstanding leg portion paralleling the circumferential external wall of said settling tank and said angle member forming therewith a circumferentially extending channel within said settling tank and at the upper portion thereof, said upstanding leg constituting a weir over which supernatant liquid may flow from said settling tank to said circumferentially extending channel; a scum gutter positioned closely adjacent said channel and closely paralleling said angle member, said scum gutter being formed with an edge portion positioned at a slightly lower level than the level of said weir, whereby floating scum may be withdrawn from said supernatant liquid into said scum gutter before said supernatant liquid can overflow said weir into said circumferentially extending channel; means for returning said removed scum to the lower portion of said settling tank; a conduit for transporting said supernatant liquid from said circumferentially extending channel outside of said settling tank; means for stirring said precipitated solids in the lower portion of said settling tank; and a conduit for removing said precipitated solids from the bottom portion of said settling tank.

HENRY L. ALEXANDER.
HUBERT I. Du PONT.
WILLING B. FOULKE.